Nov. 28, 1967  D. R. FALL  3,354,911
SEAL RETAINER AND SPACER
Filed Oct. 14, 1965
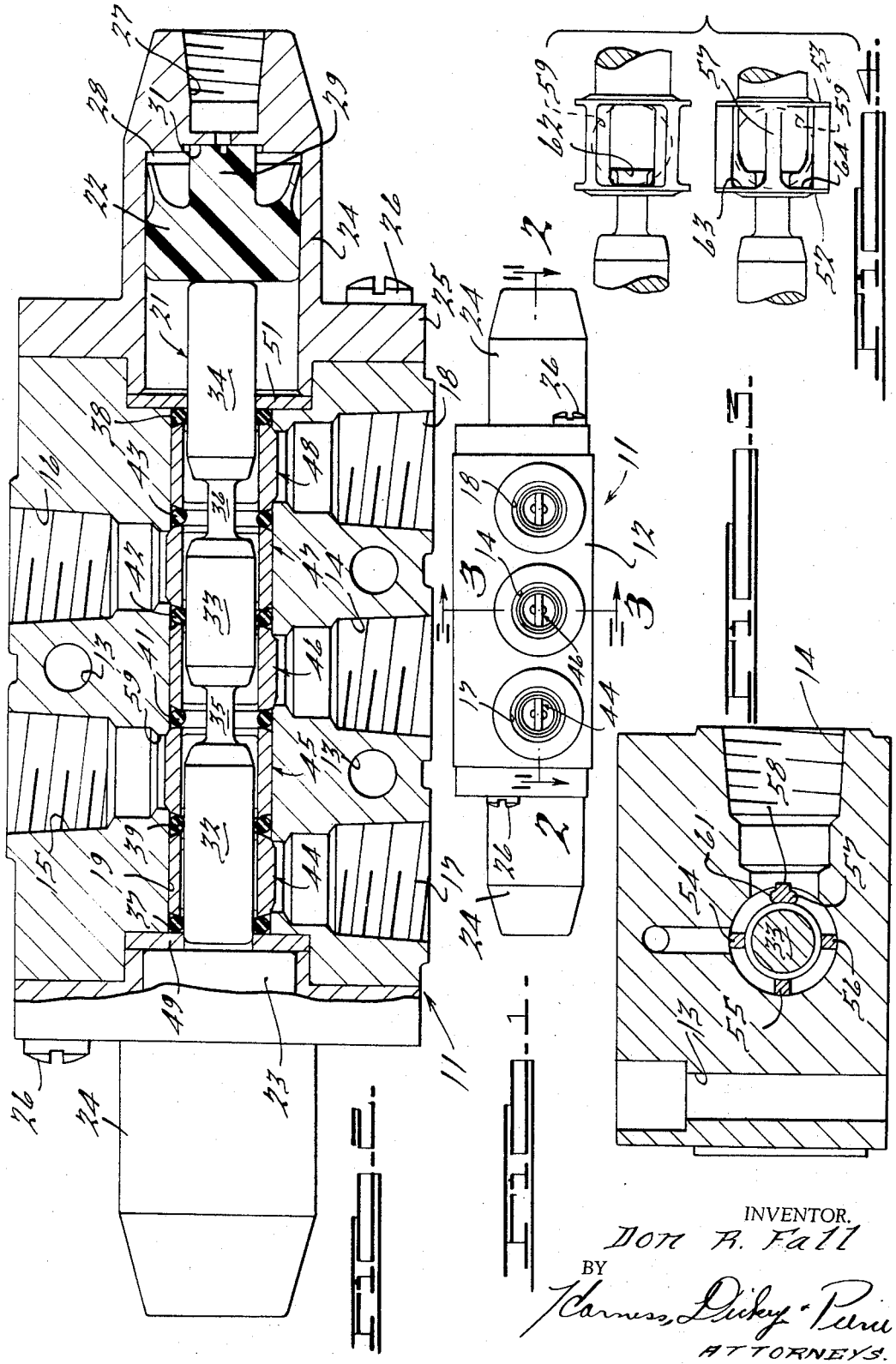
INVENTOR.
Don R. Fall
BY
Carness, Dickey & Pierce
ATTORNEYS.

United States Patent Office 3,354,911
Patented Nov. 28, 1967

3,354,911
SEAL RETAINER AND SPACER
Don R. Fall, Troy, Mich., assignor to Ross Operating Valve Company, Detroit, Mich., a corporation of Michigan
Filed Oct. 14, 1965, Ser. No. 496,046
3 Claims. (Cl. 137—625.69)

ABSTRACT OF THE DISCLOSURE

A spool valve having O-ring seals, and a seal retainer and spacer, each of which has two end rings connected by bars, one of the bars being radially enlarged and extending across a port.

---

This application relates to seal retainers and spacers, and more particularly to devices for maintaining O-rings and similar annular seals in position between the housings of spool valves.

It is an object of the invention to provide a novel and improved seal retainer and spacer which will afford maximum strength for its size and that will at the same time permit improved flow performance characteristics.

It is also an object of the invention to provide a novel and improved seal spacer construction which will limit axial play of the seals, thus preventing harmful shifting which might otherwise occur due to pressure differentials as the valve is operated.

It is another object to provide a novel and improved spool valve assembly including a seal spacer and retainer having the above characteristics, which is economical to manufacture and easy to install.

Other objects, features and advantages of the present invention will become apparent from the subsequent descriptions, taken in conjunction with the accompanying drawings.

In the drawings:

FIGURE 1 is an elevational view of a spool valve assembly incorporating the invention;

FIGURE 2 is a longitudinal cross-sectional view taken along the line 2—2 of FIGURE 1 and showing a group of the novel spacers in position;

FIGURE 3 is a transverse cross-sectional view taken along the line 3—3 of FIGURE 1 and showing the enlarged rib of one spacer; and FIGURE 4 is a partially schematic view of the novel spacer construction contrasted with a conventional construction to show the advantages of the invention in terms of increased flow area in the vicinity of a port.

Briefly, the illustrated embodiment of the invention comprises a seal spacer and retainer having a pair of annular seal engaging end portions and circumferentially spaced ribs extending between these end portions and disposed between the spool and housing of a spool valve assembly. The spacer is preferably constructed of a resilient and somewhat flexible plastic material. Four equidistantly spaced ribs are shown, the inner edges of these ribs being contiguous with the inner diameters of the end portions. The outer edges of three of the ribs are contiguous with the outer diameters of the end portions, but the fourth rib projects slightly outwardly in a radial direction between the end portions. An identifying projection is formed on an intermediate portion of this rib so that during assembly the spacer may be pressed into the housing bore in such a manner that the projecting rib will be aligned with the widest portion of the radial housing port at which the spacer is to be located. The length of the projecting portion of the rib is about equal to the diameter of this part, so that when the spacer reaches the port, this rib will snap into position, locking the spacer at that location, the enlarged rib extending across the midportion of the port.

Although this will slightly reduce the area of the port which is available for flow, it will greatly increase the flow area available for the fluid, such as air, as it passes between the spacer and the spool on its way to the other port. This is because, with four ribs, the fluid can flow to either one side or the other of the rib which is located at the port, and has two openings to flow through between the spacer and spool rather than a single opening which would be the case if ribs were located on opposite sides of the port. It has been found that the performance, in terms of pressure drop between the entrance of one port and the exit of the other port, is improved from 20% to 50% by this construction, as against a construction in which the ribs are located on opposite sides of the port and the flow can only flow through one space between two ribs.

Referring more particularly to the drawings, the valve assembly is generally indicated at 11 in FIGURE 1 and comprises an elongated body 12 of rectangular cross-sectional shape, having bolt apertures 13 for securing the body to a support, as seen in FIGURE 2. An inlet port 14 is provided in one side of body 12, and a pair of working ports 15 and 16 are formed in the opposite side thereof. A pair of exhaust ports 17 and 18 are provided alongside inlet port 14. All these ports lead to a central bore 19 extending through body 12. A spool generally indicated at 21 is disposed within bore 19 and is actuated in opposite directions by a pair of pistons 22 and 23. The pistons are disposed within cylinders 24 secured to opposite ends of body 12 by means of flanges 25 and bolts 26. The outer ends of cylinders 24 are provided with ports 27 for supplying fluid to and removing fluid from the chamber 28 formed by each piston 22. The pistons engage the opposite ends of spool 21, and engagement of their projections 29 with a corresponding shoulder 31 in cylinder 24 constitutes the limiting position in each direction for the spool.

In the position shown, inlet port 14 is connected with working port 15 and working port 16 is connected with exhaust port 18. When the spool is shifted to the left from its FIGURE 2 position, inlet port 14 will be connected to working port 16, and working port 15 will be connected to exhaust port 17. Valve 11 thus constitutes a four-way valve.

Spool 21 has three enlarged portions or lands 32, 33 and 34 connected by narrowed portions 35 and 36. Lands 32 and 34 will be in constant contact with a pair of O-ring seals 37 and 38 at opposite end of bore 19, thus preventing pressurized fluid from leaking out from the bore. Four more O-ring seals 39, 41, 42 and 43 are provided in bore 19. Seal 39 is disposed between ports 15 and 17, seal 41 between ports 14 and 15, seal 42 between ports 14 and 16 and seal 43 between ports 16 and 18. The O-rings are so located that when spool 21 is in its FIGURE 2 position, land 32 will engage seal 39 and land 33 will engage seal 42, the annular space between lands 32 and 33 connecting ports 14 and 15, while the annular space between lands 33 and 34 connects ports 16 and 18. Similarly, when spool 21 is shifted to the left from its FIGURE 2 position, land 33 will engage seal 41 and land 34 will engage seal 43. Thus, the annular space formed between lands 32 and 33 will connect ports 15 and 17, while the annular space between lands 33 and 34 will connect ports 14 and 16.

The O-rings are held in position by a series of spacers generally indicated at 44, 45, 46, 47 and 48, as well as by a pair of washer-like end members 49 and 51 through which spool 21 extends.

Each spacer is integrally made of resilient material and comprises a pair of end rings 52 and 53, as seen in FIG- URE 4, and four axially extending bars 54, 55, 56 and 57, as seen in FIGURE 3, the bars connecting ring 52 and 53. The inner diameter of the rings is slightly larger than the diameter of lands 32, 33 and 34, and the outer diameter is about equal to the diameter of bore 19. The outer surface of each bar 54 through 56 is contiguous with the outer diameter of rings 52 and 53. The inner surfaces of bars 54 through 57 are spaced slightly outwardly from the surfaces of lands 32, 33 and 34.

The surfaces of rings 52 and 53 which face the O-rings are of frustoconical shape so that the O-rings will be disposed in outwardly flared grooves, as seen in FIGURE 2. In this manner, the O-rings will be held securely in position and there will be no danger of their being forced into the path of spool 21 in such manner that they might be damaged.

As indicated previously, bars 54 through 57 are spaced 90° apart. The outer surface of bar 57 projects slightly outwardly from an imaginary cylinder passing through the outer surfaces of the other bars. This outwardly projecting portion is indicated at 58 in FIGURES 3. Its length is approximately equal to the diameter of that portion 59 of each port 14 through 18 which connects the port with bore 19. Because of this, and the resilent nature of each spacer 44 through 48, the spacers may be assembled within the body of slipping them into bore 19 until the projection 58 of each particular spacer snaps into position within its port portion 59. To do this, of course, each spacer has to be angularly oriented before it is slipped into bore 19 so that when it arrives at its proper port, projection 58 will be aligned with that port.

In order that an operator may easily identify bar 57, it is provided with a laterally enlarged portion 61, shown in FIGURE 3, which the operator may feel with his fingers, thus permitting him to angularly orient bar 57 of each spacer as he assembles it.

In operation, the fluid will flow from supply port 14 to either port 15 or 16, depending upon the position of spool 21, and from either port 16 or 15 to the corresponding exhaust port 18 or 17. This flow will take place in each case from a port portion 59, past both sides of a bar 57 which extends across this port portion, through the annular space between two lands, past both sides of a second bar 57 and into the receiving port portion 59.

In spool valve assemblies having O-ring spacers, it has been found that the critical points of fluid flow restriction are at the junctures of the ports and spacer bars. The advantages of the invention in this respect will become apparent from a study of FIGURE 4, which contrasts the flow area which would be available if a pair of bars were symmetrically arranged on opposite sides of the centerline of a port portion 59 with the two flow areas available when a bar 57 extends diametrically across a port portion 59, as in the present invention. In the first situation, seen in the upper portion of FIGURE 4, the first area is indicated by the heavy line 62, whereas the two areas provided by the present invention are indicated by the two heavy lines 63 and 64 in the lower portion of FIGURE 4.

It should be pointed out that it is necessary to have at least four bars, as shown, in order to achieve proper strength in the spacers without having to increase the bore diameter in order to permit an increase in the cross-section of the bars. Such an increase in cross-section would, in any event, cause the bars to restrict still further the available fluid flow area. It is also impractical to undercut the inner portions of the bars or relieve their outer portions in order to increase the flow area past them, since this again would result in a weaking of the bars, in addition to involving machining expense. The present invention therefore has the advantage of attaining optimum flow area for this type of spacer construction while permitting easy assembly of the spacers and O-ring seals in their proper orientation.

It should be kept in mind that it is not absolutely essential that bar 57 of the spacer be exactly diametrically positioned with respect to its corresponding port, although this is desirable. The invention of course makes it easy to so orient the spacers. If one or more were assembled the wrong way, however, the result would be a loss of performance rather than an inoperative device.

In some situations, it would be permissible to insert one or more spacers with any of several different angular orientations. One such situation would be when the body has angularly spaced alternately usable ports at the same axial location. A second would be where two angularly spaced ports at the same axial location are used as a through passage in addition to or instead of their use as ports.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. In a spool valve assembly, a body having a bore, a spool having spaced lands within said bore, axially spaced ports in said body, an annular seal in said bore between said ports, and a spacer in said bore opposite at least one of said ports, said spacer having a pair of end rings, one of which is engageable with said seal and axially extending bars between said end rings equidistantly angularly spaced around said spacer, one of bars being slightly radially enlarged with respect to the others with the length of the radial enlargement being about equal to the port diameter whereby the radial enlargement will lock into position within its corresponding port when the spacer is inserted in the bore with said enlarged bar aligned with said port.

2. In a spool valve assembly, a body, a bore extending through said body, a plurality of axially spaced ports in said body connected with said bore, O-rings between each adjacent pair of ports, a spool slidably mounted within said bore and having spaced lands engageable with said O-rings, a series of O-ring spacers between said O-rings, each spacer comprising a pair of end rings having frustoconical surfaces engaging said O-rings, whereby the O-rings are retained against movement into said bore by said frustoconical surfaces, and a plurality of axially extending bars connecting said end rings, one bar of each of said spacers extending across an intermediate portion of one of said ports, where by fluid flowing to or from said port will flow past said both sides of said last-mentioned bar.

3. The combination according to claim 2, said end rings and the outer surfaces of all said bars except the last-mentioned bar of each spacer having approximately the same diameter as said bore, said last-mentioned bar being slightly enlarged in a radial direction and along a length approximately equal to the diameter of the port with which it is associated, said spacers being of resilient material whereby each spacer may be snapped into position opposite its corresponding port when it is inserted in the bore with the enlarged bar aligned with its port.

References Cited

UNITED STATES PATENTS 3,199,540   8/1965   Forster _____ 137—625.69

M. CARY NELSON, *Primary Examiner.*

R. J. MILLER, *Assistant Examiner.*